(12) United States Patent
Tuulos et al.

(10) Patent No.: US 9,986,144 B2
(45) Date of Patent: May 29, 2018

(54) PORTABLE DEVICES WITH ADJUSTABLE OPTICAL ARRANGEMENT

(71) Applicant: Microsoft Technology Licensing, LLC, Redmond, WA (US)

(72) Inventors: Eero Tuulos, Ylöjärvi (FI); Urho Konttori, Helsinki (FI); Mikko Juhola, Salo (FI); Marko Eromäki, Tampere (FI); Eero Salmelin, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/174,992

(22) Filed: Jun. 6, 2016

(65) Prior Publication Data

US 2017/0353643 A1    Dec. 7, 2017

(51) Int. Cl.
| | |
|---|---|
| H04N 5/225 | (2006.01) |
| H04N 5/232 | (2006.01) |
| G03B 7/00 | (2014.01) |
| G03B 11/04 | (2006.01) |
| G03B 17/00 | (2006.01) |

(52) U.S. Cl.
CPC ............. *H04N 5/2257* (2013.01); *G03B 7/00* (2013.01); *G03B 11/04* (2013.01); *G03B 17/00* (2013.01); *H04N 5/2254* (2013.01); *H04N 5/23212* (2013.01)

(58) Field of Classification Search
None
See application file for complete search history.

(56) References Cited

U.S. PATENT DOCUMENTS

| | | | |
|---|---|---|---|
| 7,058,433 B2 | 6/2006 | Carpenter | |
| 7,139,473 B2 | 11/2006 | Shimano et al. | |
| 8,098,319 B2* | 1/2012 | Demuynck | G02B 7/08 348/335 |
| 8,400,564 B2 | 3/2013 | Jacobs | |
| 9,504,170 B2* | 11/2016 | Rothkopf | H04M 1/0216 |

(Continued)

FOREIGN PATENT DOCUMENTS

WO    2006028041 A1    3/2006

OTHER PUBLICATIONS

Pierce, David, "Sony Tablet P review", Published on: Mar. 6, 2012, 8 pages, Available at: http://www.theverge.com/2012/3/6/2847197/sony-tablet-p-review.

(Continued)

*Primary Examiner* — James Hannett (57) ABSTRACT

A portable device comprises a first portion and a second portion, the first portion having a first front surface and a first back surface. The first portion comprises an image sensor and a first imaging optical arrangement lying in imaging connection with the image sensor and defining a first field of view with a wide angle of view. The second portion comprises a second imaging optical arrangement. The first and the second portions are movably coupled to allow adjustment of the device to a closed position with the second portion lying against the first back surface, with the second imaging optical arrangement aligned with the first imaging optical arrangement, whereby the first and the second imaging optical arrangements define a second field of view, and to open positions with the second portion lying outside the first field of view.

20 Claims, 4 Drawing Sheets

(56) References Cited

U.S. PATENT DOCUMENTS

| | | |
|---|---|---|
| 2004/0116166 A1 | 6/2004 | Makishima |
| 2004/0183935 A1 | 9/2004 | Shimano et al. |
| 2006/0142053 A1* | 6/2006 | Garcia ................ G03B 29/00 455/556.1 |
| 2007/0183043 A1 | 8/2007 | Bito et al. |
| 2008/0165439 A1 | 7/2008 | Chang |
| 2009/0059043 A1* | 3/2009 | Demuynck ......... H04M 1/0216 348/294 |
| 2013/0076964 A1* | 3/2013 | Sirpal ................ G06F 3/1438 348/333.12 |
| 2013/0235346 A1* | 9/2013 | Huang ................ A61B 3/152 351/208 |
| 2014/0106822 A1 | 4/2014 | Smith et al. |
| 2015/0221065 A1 | 8/2015 | Kim et al. |

OTHER PUBLICATIONS

"International Search Report and Written Opinion Issued in PCT Application No. PCT/US2017/034898", dated Aug. 7, 2017, 12 pages.

\* cited by examiner

PORTABLE DEVICES WITH ADJUSTABLE OPTICAL ARRANGEMENT

BACKGROUND

Various portable devices may incorporate a digital camera comprising an image sensor for capturing still images and/or videos. The versatility of such a camera may be highly dependent on the properties of the optical arrangement arranged in connection with the image sensor.

The complexity and adjustability of the optical arrangement may be limited by the space available in the device. In particular, the thickness of the device is often limited, allowing a strictly limited thickness or length of the optical arrangement only. This may be the case, for example, in foldable devices where the maximum thickness of each portion of the device is restricted by the maximum allowable overall thickness of the device in its folded position.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A portable device is disclosed which may be, for example, a laptop computer or any type of mobile device such as a mobile phone, a smart phone, a tablet computer, or a digital compact camera.

The device may comprise a first portion and a second portion, the first portion having a first front surface and an opposite first back surface facing to front and back sides of the first portion, respectively. The first portion may comprise an image sensor and a first imaging optical arrangement in imaging connection with the image sensor, the first imaging optical arrangement being configured to define a first field of view of the image sensor having a wide angle of view lying, for example, in a range of 60° to 120°, and a viewing direction of the image sensor to the back side of the first portion. The second portion may comprise a second imaging optical arrangement.

The first and the second portions may be movably coupled to allow adjustment of the device to a closed position with the second portion lying opposite to the first portion, against the back surface thereof, with the second imaging optical arrangement aligned with the first imaging optical arrangement so as to define, together with the first imaging optical arrangement, a second field of view of the image sensor different from the first field of view, and to open positions with the second portion lying outside the first field of view of the image sensor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings (not in scale), wherein.

DETAILED DESCRIPTION

The detailed description provided below in connection with the appended drawings is intended as a description of a number of embodiments and is not intended to represent the only forms in which the embodiments may be constructed, implemented, or utilized. Some embodiments discussed below may allow, for example, improved imaging optical arrangements arranged in imaging connection with an image sensor, utilizing effectively the limited space possibly available for the imaging optical arrangements.

Figure 1A:
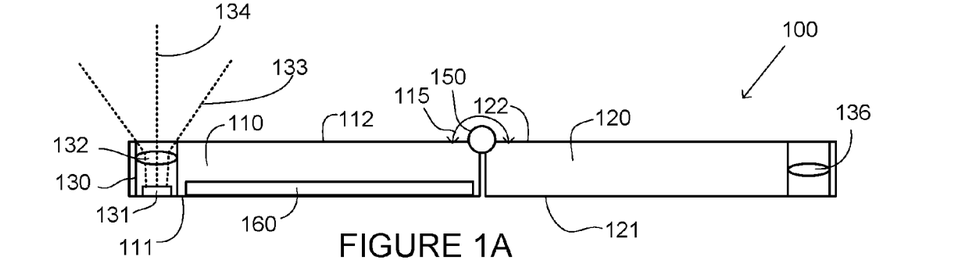
FIGS. 1A and 1B illustrate a portable foldable device with an image sensor as schematic side drawings.
Figure 1B:
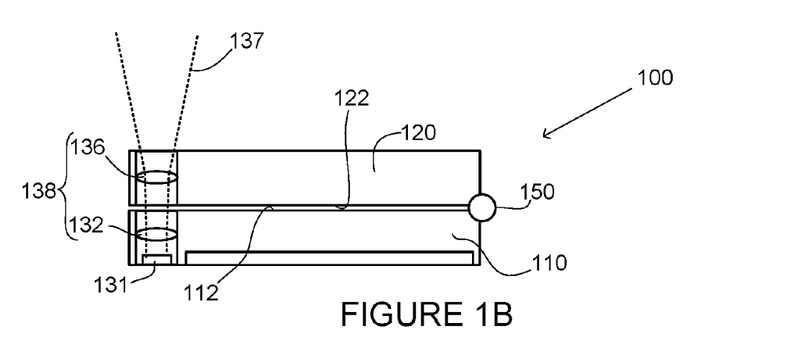

The device 100 of FIGS. 1A and 1B may be any type of portable or mobile device, such as a laptop computer, mobile phone, smartphone, tablet computer, a wearable device, or a compact digital camera.

The device comprises a first portion 110 and a second portion 120 pivotally or hingedly coupled to each other via a hinge 150.

In the embodiment of FIGS. 1A and 1B, the first and the second portions are substantially planar. In other embodiments, the first and/or the second portions may be curved.

The first portion has a first front surface 111 and a first back surface 112 opposite to the first front surface, the first front and back surfaces defining, and facing to, front and back sides of the first portion. Correspondingly, the second portion comprises a second front surface 121 and an opposite second back surface 122 facing to front and back sides of the second portion, respectively.

The first portion comprises a digital camera arrangement 130 comprising an image sensor 131 and a first imaging optical arrangement 132 positioned and arranged in imaging connection with the image sensor.

An "image sensor" refers to a light sensitive component or element capable of capturing digital image frames of a scene shot by a digital camera arrangement comprising the image sensor and possibly also, for example, one or more imaging optical arrangements. The image sensor may comprise, for example, a CMOS (Complementary Metal Oxide Semiconductor), a CCD (Charge-Coupled Device) or any other appropriate type of sensor element as an active, light detecting imaging element.

A "digital image frame", or shortly a "frame", refers to a data content captured via exposure of pixels or some other light-sensing element(s) of an image sensor. A frame thus comprises image data enabling composition of a displayable digital image on the basis of that image data. Image data of a digital image may comprise, for example, information about light energy received by pixels of an image sensor. A digital image frame may comprise image data for a still image. Alternatively, it may be one frame of a video frame sequence of a plurality of sequentially captured frames.

Being "in imaging connection" with the image sensor refers to that the first imaging optical arrangement 132 is so configured, and so positioned relative to the image sensor 131, that it enables an image, i.e. a digital image frame, of a scene shot by the digital camera arrangement to be formed on the image sensor. To summarize, imaging connection between an image sensor and an imaging optical arrangement allows digital image frames to be captured by the image sensor by receiving light propagated through and/or guided by the imaging optical arrangement. Thereby, a digital image may be captured of the scene by the digital camera arrangement. The image sensor and the first imaging optical arrangement therefore form a fully operable imaging system.

The first imaging optical arrangement defines, when in use, a first field of view 133 having an angle of view, and a viewing direction 134 to the back side of the first portion.

Figure 2:
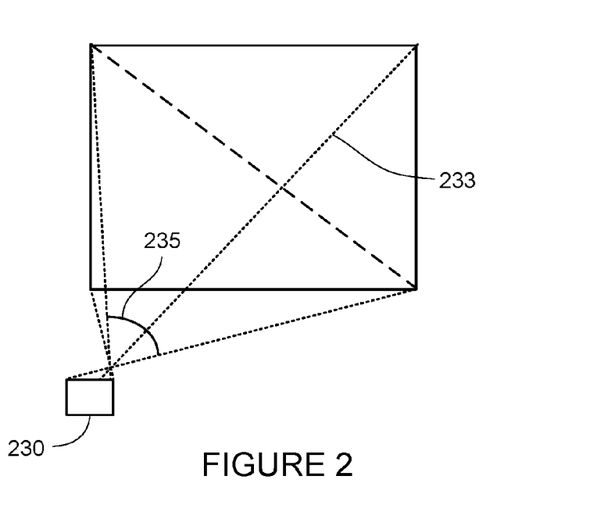
FIG. 2 illustrates an angle of view of an image sensor.

The "angle of view" refers to the width of the field of view 134 of the image sensor. As illustrated in FIG. 2, it is defined as the angular extent 235, defined diagonally, of a scene within the field of view 233, imaged by the digital camera arrangement 230. In the device of FIG. 1, the angle of view of the first field of view is a wide angle of view. The corresponding field of view may be considered as a wide field of view. The wide angle of view of the first field of view may lie, for example, in the range of 60 to 90 degrees, or in any other appropriate wide angle of view range. In some applications, the angle of view of the first field of view may be as high as 100 degrees or higher, for example, 120 degrees.

The first imaging optical arrangement 132 may be configured to define one fixed field of view. In other embodiments, it may be configured to allow adjustment of the field of view within a wide angle of view range.

A "viewing direction" refers to the central direction from which the image sensor captures light, or to which direction the image sensor can "see". The viewing direction may also refer to the direction of an optical axis of the system formed by the image sensor and the imaging optical arrangement connected to it.

In the embodiment of FIGS. 1A and 1B, the viewing direction is directed substantially perpendicularly to the first portion 110 of the device 100. In other embodiments, other directions are possible.

The second portion comprises a second imaging optical arrangement 136.

In FIG. 1A, the device 100 is illustrated in a flat open position where the first portion 110 and the second portion 120 lie substantially parallel, adjacent to each other, forming a flat overall shape of the device. In this position, the second portion 120 of the device lies outside the first field of view of the image sensor 131. This is one example of possible open positions into which the device may be folded by pivoting the first and the second portions relative to each other about the hinge 150. In foldable device construction, an open position refers to a position in which a non-zero opening angle 115 is formed between the first and the second back surfaces 112, 122 of the first and the second portions of the device.

In FIG. 1B, the device 100 is illustrated as folded to a closed or folded position with the second portion 120 lying opposite to the first portion 110, against the first back surface 112. The second back surface 122 of the second portion and the first back surface 112 of the first portion face and lie against each other.

The second imaging optical arrangement 136 is positioned in the second portion 120 so that with the device 100 in the closed position, the second imaging optical arrangement 136 is aligned with the first imaging optical arrangement 132.

Being aligned with the first imaging optical arrangement refers to positioning of the second imaging optical arrangement 136 relative to the first imaging optical arrangement 132 in such a way that image capturing by the image sensor 131 through the both imaging optical arrangements is possible.

The second imaging optical arrangement 136 is so configured that, with the device in the closed position, it defines together with the first imaging optical arrangement 132 a second field of view 137 which is different from the first field of view. The first and the second imaging optical arrangements may be considered as determining a combined imaging optical arrangement 138 in imaging connection with the image sensor 131.

The presence of the first and the second imaging optical arrangement enables using the digital camera arrangement with two different imaging optical arrangements. Selection of the desired imaging optical arrangement may be made simply by adjusting the device position by foldably moving the first and the second portions relative to each other, thereby folding the device to an open or to a closed position.

In the embodiment of FIGS. 1A and 1B, the digital camera arrangement 130 and the second imaging optical arrangement 136 are positioned close to the ends of the first and the second portions 110, 120, respectively, which are opposite to the ends thereof attached to the hinge 150. In other embodiments, other positioning is possible.

The first and the second imaging optical arrangements, schematically illustrated in FIGS. 1A and 1B as single lenses, may comprise any appropriate optical components, modules, and elements, such as one or more lenses, for carrying out the imaging operations described above.

In any of the first and the second imaging optical arrangements, one or more lenses or lens groups and/or the location thereof may be adjustable so that the field of view of the image sensor may be changed. Also the first and/or the second field of view of the image sensor may be adjustable by the optical arrangement(s). To move the location of one or more lenses or lens groups, for example, actuators comprising a voice coil motor or piezo actuators may be included in the imaging optical arrangement(s). Further, any appropriate arrangements, elements, and operations as such known in various auto focus systems may be present in the optical arrangement and utilized for carrying out the adjustment of the focus distance of the image sensor. The imaging optical arrangements may also comprise arrangement(s) for image stabilization.

The wide field of view of the first imaging optical arrangement may be advantageous in that it may be possible to implement a high quality wide angle imaging optical arrangement having a lower thickness or length than a narrow field imaging optical arrangement with respectively high quality. Because the first imaging optical arrangement lies in front of the image sensor, there is limited thickness or length available for the first imaging optical arrangement.

Further, the wide angle first field of view in use with the device in an open position may be advantageous in that a large display area may be implemented, for viewing the large image area of the image sensor, on the front and/or on the back surfaces of the first and the second portions with the device in an open position.

In the embodiment of FIGS. 1A and 1B, the second imaging optical arrangement 136 is configured to produce the second field of view narrower than the first field of view. In other embodiments, other types of second imaging optical arrangements may be used. In one exemplary embodiment, the angle of view of the first field of view is 100 degrees or higher, and the second field of view has an angle of view in a range of 75 to 80 degrees.

In the embodiment of FIGS. 1A and 1B, the second imaging optical arrangement 136 comprises a teleconverter. In other embodiments, other types of second imaging optical arrangements, producing the second field of view narrower than the first field of view, may be used.

A "teleconverter" refers to an imaging optical arrangement configured to be used in connection with an existing imaging optical arrangement to form a combined imaging optical arrangement having a focal length which is longer than the focal length of the existing imaging optical arrangement. Along the change of the focal length, the field of view also changes. A teleconverter may provide a cost efficient and compact way to produce a long focal length.

The teleconverter of the second imaging optical arrangement 136 may be, for example, a duplicate teleconverter producing a focal length which is twice as long as the focal length of the first imaging optical arrangement 132. Then, the second field of view may have an angle of view which is roughly half of the angle of view of the first field of view.

The device comprises, in the first portion thereof, a display 160 positioned on the first front surface 111 of the first portion. The digital camera arrangement 130 is positioned outside the area of the first portion covered by the display. This may provide a greater thickness available for the digital camera arrangement in comparison to a position in the area covered by the display.

The display 160 may be implemented as a main display of the device 100, forming a part of the user interface of the device. For example, the display may be configured to display the scene shot by the digital camera arrangement 130 during image capturing, or displaying ready generated digital images formed on the basis of image data of captured digital image frames.

In other embodiments, also the second portion may comprise a display on the second front surface thereof. Such displays may be operationally distinct. In other embodiments, the first and the second portions may comprise a first and a second display section, respectively, together forming a larger, operationally combined display when the device is in an open position.

In other embodiments, instead of or in addition to a display or display section positioned on the first front surface and a possible display or display section positioned on the on the second front surface, there may be one or more displays or display sections on one or both of the first and the second back surfaces.

Being positioned "on the first/second front/back surface" of the first/second portion refers to positioning where the display faces towards the front/back side of the first/second portion of the device, enabling displaying information by the display to the front/back side of the first/second portion 110, 120 of the device 100. The actual display element or module does not necessarily form the outermost surface of the device portion at issue, but there may be some other layer(s) on the display forming the outermost surface.

The digital camera arrangement 130 may be the main camera of the device. The device may further comprise (not illustrated in the drawings) another digital camera arrangement serving as a front camera.

Figure 3A:
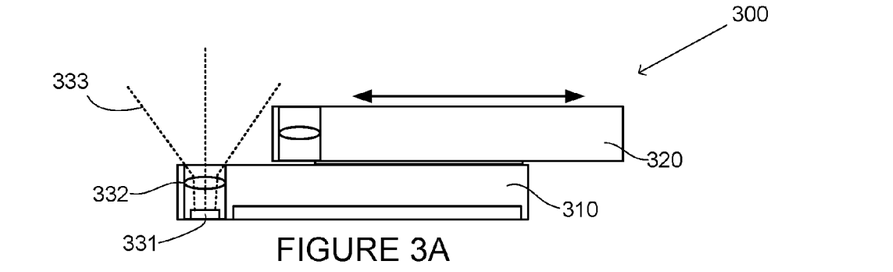
FIGS. 3A and 3B illustrate a portable device with an image sensor and two slidably coupled portions as schematic side drawings.
Figure 3B:
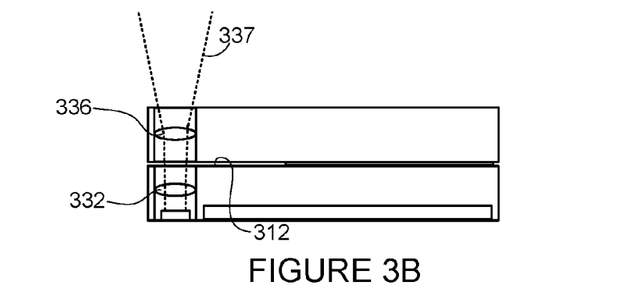

The device 300 of FIGS. 3A and 3B differ from that discussed above with reference to FIGS. 1A and 1B in that instead of a foldable construction, movable coupling between the first and the second portion 310, 320 of the device is implemented by having those portions slidably coupled.

In FIG. 3A, the device is in an open position with the second portion 320 lying outside the wide angle first field of view 333 of the image sensor 331 defined by the first imaging optical arrangement 332. In a slidable device configuration an open position refers to a position where the second portion is slided away from the closed position so as to expose the first imaging optical arrangement of the first portion.

In FIG. 3B, the device is illustrated as slidably adjusted to a closed position where the second portion lies opposite to the first portion, against the first back surface 312 thereof. The second imaging optical arrangement 336 is positioned to be aligned then with the first imaging optical arrangement 332 so that the first and the second imaging optical arrangements together define the second field of view 337 which is, in this embodiment, narrower than the first field of view.

Figure 4:
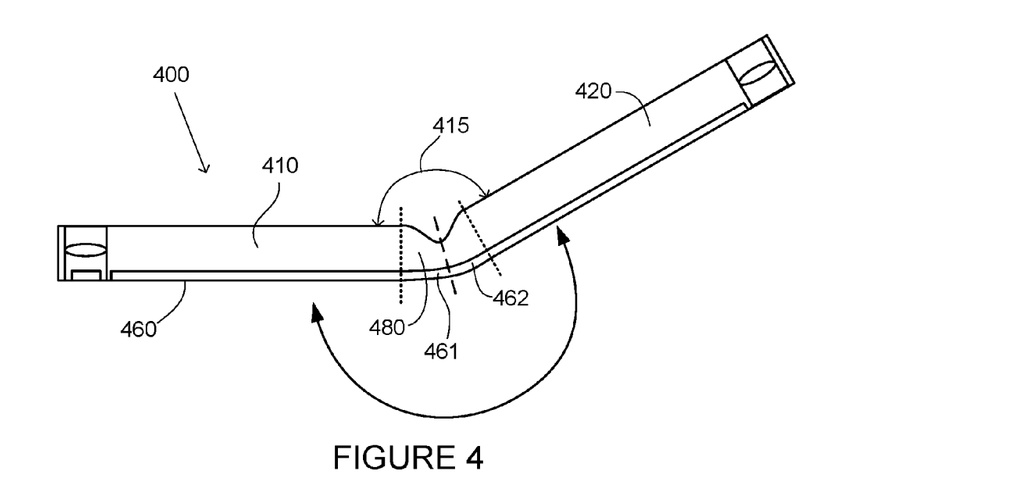
FIGS. 4, 5, 6A to 6C, 7, 8A and 8B illustrate portable foldable devices with an image sensor as schematic side drawings and perspective drawings.

The device 400 of FIG. 4 differs from that discussed above with reference to FIGS. 1A and 1B in that instead of a hinge, the first and the second portion 410, 420 of the device are coupled via a flexible folding portion 480 allowing the first and the second portions to be pivotally turned relative to each other.

The flexible folding portion connects the first and the second portions so that one single integral device body is formed. The first and the second portions may be rigid structures. In other embodiments, one or both of them may be flexible structures.

The device 400 is illustrated in FIG. 4 in an open position with the opening angle 415 between the first and the second portion between zero and 180°. Similarly to the device discussed above with reference to FIGS. 1A and 1B, the device 400 may be folded to a flat open position with an opening angle of 180°, to a closed position with the back surfaces of the first and the second portions lying against each other, and to any open position between the flat open position and the closed position.

The device 400 differs from that discussed above with reference to FIGS. 1A and 1B also in that the first and the second portions 410, 420 comprise a first and a second display section 461, 462, respectively, which face towards the front sides of the first and the second portions. Instead of being discrete, separate display elements, the first and the second display sections form a single continuous, flexible display 460 extending over the flexible folding portion 480.

In other embodiments, two discrete display sections may be present in the first and the second portions of the device. In yet other embodiments, there may be one single display or display section in the first portion or in the second portion only.

Figure 5:
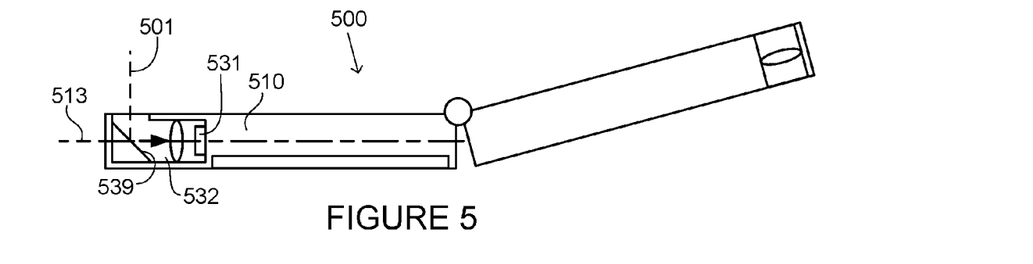

The first portion 510 of the device 500 of FIG. 5 extends along, i.e. parallel to and about, a fictitious central plane 513. The device 500 differs from that discussed above with reference to FIGS. 1A and 1B in that the first imaging optical arrangement 532 of the digital camera arrangement 530 is folded so that it guides, when in use, light to the image sensor substantially parallel to the central plane. The image sensor itself faces sideward, i.e. parallel to the central axis. The first imaging optical arrangement 532 comprises a mirror 539. Light 501 incident on the first imaging optical arrangement 532 from the back side of the first portion is reflected, with the device in use, at the mirror towards the image sensor 531, as marked by an arrow.

The folded optics may provide more space, especially a longer optical path from the back surface of the first portion to the image sensor. This may enable use of optical arrangements which would not be possible with un-folded construction with less space or shorter optical path.

In other embodiments with folded first optical arrangement, instead of one opaque mirror, there may be two mirrors, at least one of which being semitransparent, configured to allow light to enter the first portion from both the front and the back side thereof. Then, the second portion of the device may comprise a third imaging optical arrangement and it may be foldable or turnable to another closed position with the second front surface of the second portion lying against the first front surface of the first portion, with the third imaging optical arrangement aligned with the two-directional first imaging optical arrangement. That way, three different imaging optical arrangements may be achievable by folding the device into appropriate positions.

Figure 6A:
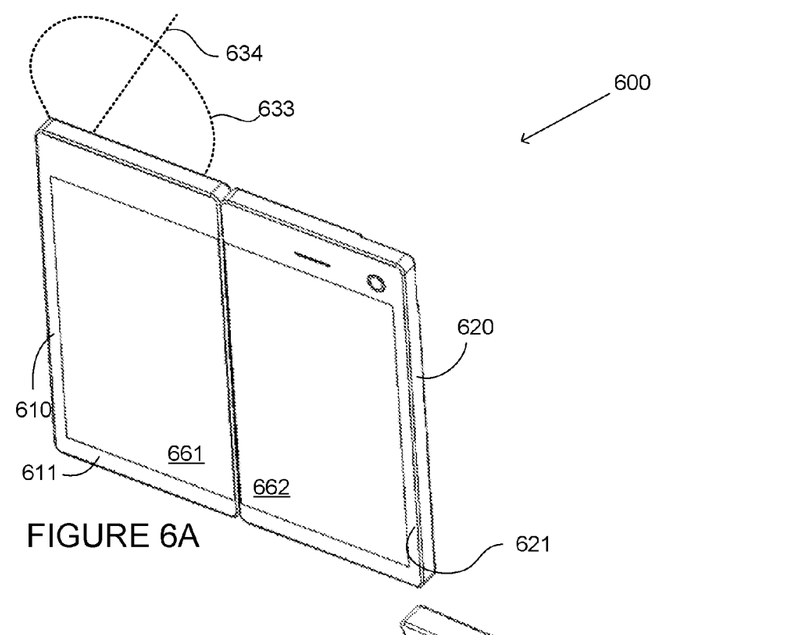
Figure 6B:
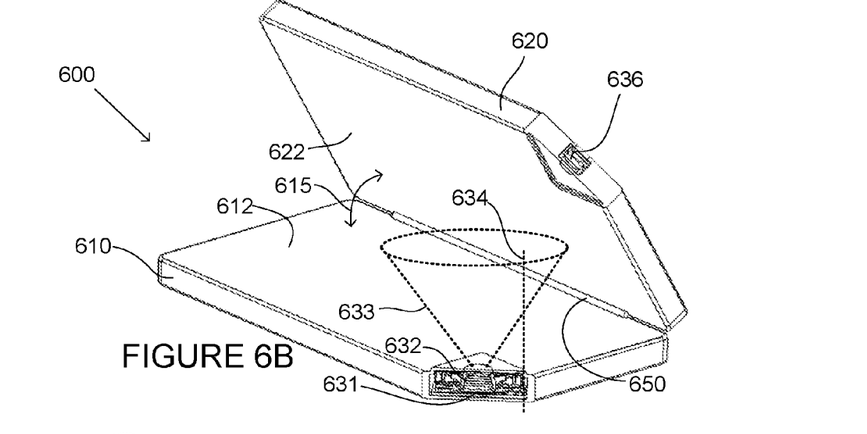
Figure 6C:
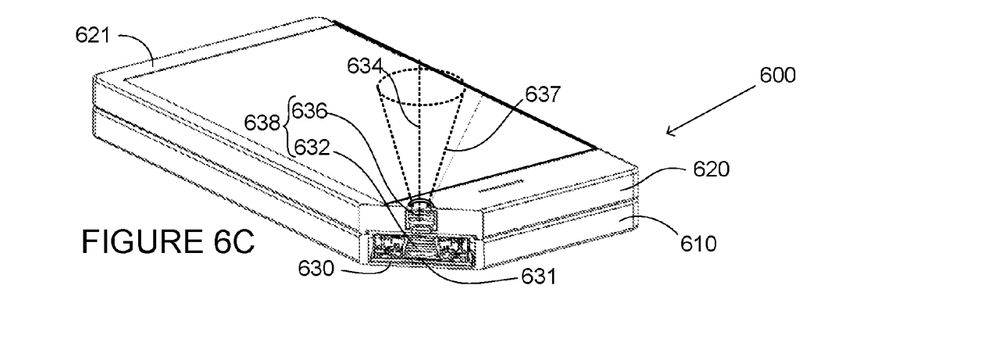

In the device 600 of FIGS. 6A to 6C, the first portion 610 and the second portion 620 of the device are foldably coupled via a hinge 650, and each of them has a front surface, namely, a first front surface 611 of the first portion and a second front surface 621 of the second portion. Each portion also has an opposite back surface, namely, a first back surface 612 of the first portion and a second back surface 622 of the second portion.

In FIGS. 6A, the device 600 is illustrated in a flat open position with an opening angle of 180° between the back surfaces 612, 622 of the first and the second portions.

In FIG. 6B, the device 600 is illustrated in an open position with another non-zero opening angle 615 between the first and the second back surfaces 2, 622.

In FIG. 6C, the device 600 is illustrated as folded into a folded or closed position where the back surfaces 612, 622 of the first and the second portion 610, 620 lie against each other.

On the front surfaces 611, 621 of the first and the second portion, there are first and second display sections 661, 662 facing to the front side of the first and the second portion of the device, respectively.

The first and the second display section may form, with the device in the flat open position, a large, operationally combined single display. Then, the information content to be displayed may be divided between those two display sections. In other embodiments, the two display sections may operate separately, for displaying different contents.

The first portion 610 comprises a digital camera arrangement in the form of a camera module 630 comprising an image sensor 631 and a first imaging optical arrangement 632 which is in imaging connection with the image sensor and defines, with the image sensor in use, a viewing direction 634 of the image sensor directed to the back side of the first portion.

The digital camera module 630 comprising the image sensor and the first imaging optical arrangement is positioned at a corner of the first portion, outside the area of the first display section.

The second portion 620 of the device comprises a second imaging optical arrangement 636 positioned at a corresponding corner of the second portion 620 so that, with the device folded into the folded position, the first and the second imaging arrangement together form a combined imaging optical arrangement 638 in imaging connection with the image sensor 631.

In the embodiment illustrated in FIGS. 6A to 6C, the first imaging optical arrangement and the combined imaging optical arrangements define different fields of view of the image sensor. With the device in an open position, the first field of view 633 is a wide angle field of view which may have, for example, an angle of view similar to the device discussed above with reference to FIGS. 1A and 1B. With the device in the folded position, the combined imaging optical arrangement 638 defines a narrower second field of view 637.

In other embodiments, different configurations may be possible. For example, the first field of view is not necessarily a wide angle one, and/or combined imaging optical arrangement 638 may define a second field of view 637 which is wider than the first field of view. For example, a combined imaging optical arrangement may form a fish-eye type optical arrangement defining a field of view having an angle of view of 180°.

In yet other embodiments, the second imaging optical arrangement 636 may produce other effects than changing the field of view of the image sensor 631. For example, it may comprise a high distortion lens or lens group producing some specific image effect(s).

The large display area formed by the first and the second display sections 661, 662, combined with the image sensor viewing to the opposite sides of the first and the second portions may advantageously provide a closer or wider view on the scene shot by the image sensor. For example, objects in the scene may be first viewed and observed on this large display area, and after selection of the most desirable aiming of the viewing direction 634, images may be captured either using the first imaging optical arrangement 632 only, or using the combined imaging optical arrangement 638 with the device in the folded position.

Said large display area may be particularly advantageous for viewing the scene shot by the image area, or digital images formed in the basis of ready captured digital image frames, in the specific case of the embodiment of FIGS. 6A to 6C where the first imaging optical arrangement 632 defines the wide angle first field of view 633.

In any of the devices of FIGS. 1A, 1B, 3A, 3B, 4, 5, and 6A to 6C, the image sensor may be configured to detect visible light for capturing digital image frames for general purpose digital images.

Figure 7:
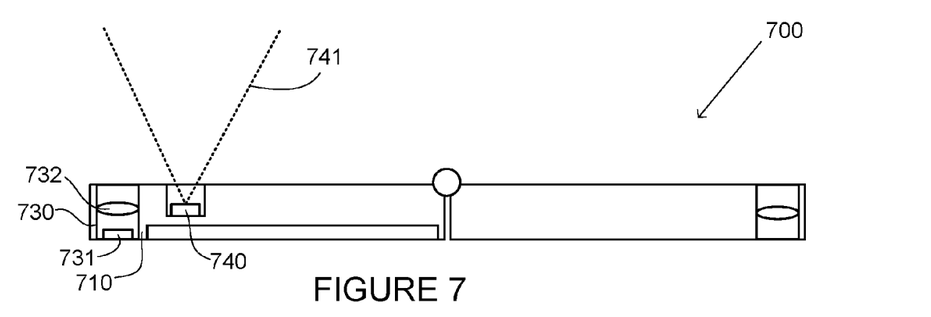

In other embodiments, in a device in accordance with any of those devices, the image sensor may be configured to detect, in addition to or instead of visible light, infrared light. By detecting infrared light, digital images may be captured which may be used for specific purposes, such as detection and recognition of iris of an eye or some other biometric identifier. One embodiment of this type is illustrated in FIG. 7.

The device 700 of FIG. 1 may be generally in accordance with the device discussed above with reference to FIGS. 1A and 1B. The image sensor 731 of the digital camera arrangement 730 is configured to detect infrared light. The device 700 differs from that one discussed above with reference to FIGS. 1A and 1B in that its first portion 710 further comprises an infrared light source 740 which, when in use, emits infrared light 741 and illuminates a scene viewed by the image sensor by the infrared light.

Figure 8A:
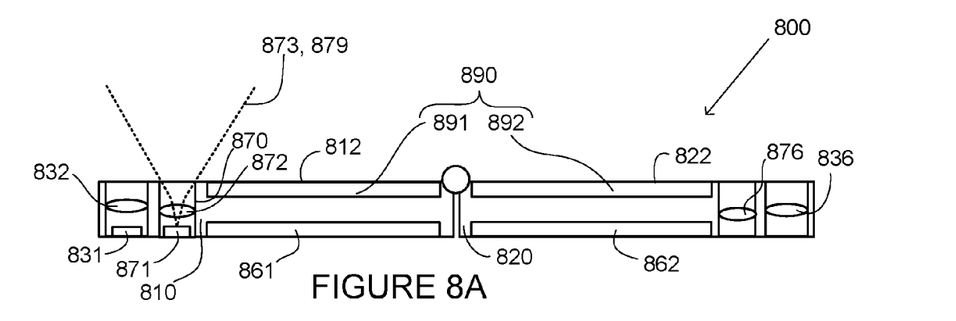
Figure 8B:
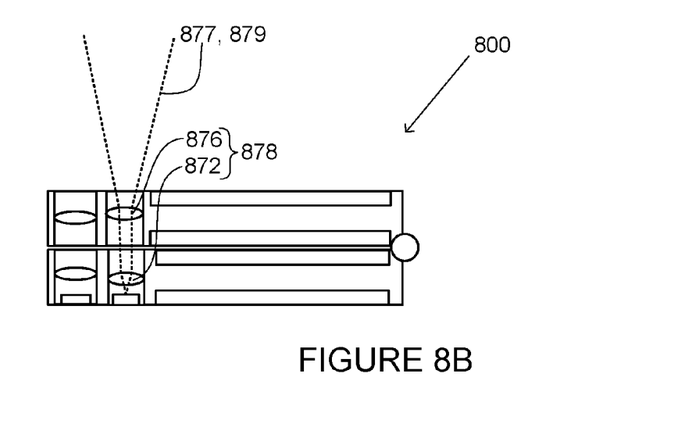

The device 800 of FIGS. 8A and 8B may be generally in accordance with the device discussed above with reference to FIGS. 1A and 1B.

In addition to an image sensor 831 and a first imaging optical arrangement 832 associated to it, the first portion 810 of the device comprises a flash 870 comprising a flash light source 871 and a first flash optical arrangement 872 configured to guide light 879 emitted by the flash light source, with the device in an open position as that illustrated in FIG. 8A, to the back side of the first portion, into a first field of illumination 873.

The second portion 820 of the device comprises, in addition to a second imaging optical arrangement 836, also a second flash optical arrangement 876. The second flash optical arrangement is located in the second portion 820 so that, with the device in the closed position as illustrated in FIG. 8B, it is aligned with the first flash optical arrangement and forms, together with the first flash optical arrangement, a combined flash optical arrangement 878 which guides, when in use, light 879 emitted by the flash light source into a second field of illumination 877 which is different from the first field of illumination.

By the arrangement discussed above, flash light illumination of a scene shot by the image sensor 831 may be adjusted in a corresponding manner that field of view of the image sensor. For example, when a wide or narrow field of view of the image sensor is in use, a wide or narrow field of illumination of the flash, respectively, may be arranged to be in use. Thereby, the field of illumination of the flash may be adapted in accordance with the selected field of view of the image sensor. This may improve the quality of a digital image frame captured by the image sensor while illuminating the scene by the flash.

The first and the second flash optical arrangements, schematically illustrated in FIGS. 8A and 8B as single lenses, may comprise any appropriate optical components, modules, and elements, such as one or more lenses, for carrying out the imaging operations described above.

In any of the first and the second flash optical arrangements, one or more lenses or lens groups and/or the location thereof may be adjustable so that the field of illumination may be adjusted. To move the location of one or more lenses or lens groups, for example, actuators comprising a voice coil motor or piezo actuators may be included in the flash optical arrangement(s).

In the embodiment of FIGS. 8A and 8B, the first field of view of the image sensor may wider than the second field of view 837. Correspondingly, the first field of illumination 873 of the flash is wider than the second field of illumination 877. In other embodiments, the first field of view and the first field of illumination may be narrower than the second field of view and the second field of illumination, respectively.

In FIGS. 1A, 1B, 3A, 3B, 4, 5, 6A to 6C, and 7, displays and display sections are illustrated as being present on the front surfaces of the first and the second portions of the devices only. In other embodiments, there may be one or more displays or display sections on the back surface of the first and/or the second portion of the device also. In general, a device may comprise any number of displays or display sections on front and/or back surfaces of the first and the second portions of the device.

For example, there may be a first back display section and a second back display section on the back surfaces of the first and the second portions, the first and the second back display sections forming one single combined, large-area back display. Such arrangement may be useful, for example, in the case of a wide angle first field of view, for using the image sensor as a camera for video calls. The wide angle image of the image sensor may be displayed for the user of the device in the large-area back display.

The embodiment illustrated in FIG. 8 represents an example of a device having, in addition to first and second display sections 861, 862 on the first ant the second front surfaces of the first and the second portions, respectively, also a first back display section 891 and a second back display section 892 on the back surfaces 812, 822 of the first and the second portions 810, 820, respectively. The first and the second back display sections form a large-area back display 890 which may operate, when in use, as one combined display. In other embodiments, the first and the second back display sections may be operationally separate display sections. Similarly, the first and the second display sections 861, 862 on the front surfaces of the first and the second portions may operate separately or as an operationally combined display.

For example, the first imaging optical arrangement being configured to define a first field of view of the image sensor may refer to the first imaging optical arrangement comprising, constituting, or serving as, means for defining a first field of view of the image sensor. As another example, an infrared light source which, when in use, emits infrared light and illuminates a scene viewed by the image sensor by the infrared light, may refer to the infrared light source comprising, constituting, or serving as, means for emitting infrared light and illuminating the scene by the emitted infrared light.

Some embodiments are further discussed shortly in the following.

In an aspect, a portable device comprises a first portion and a second portion, the first portion having a first front surface and an opposite first back surface facing to front and back sides of the first portion, respectively.

The first portion comprises an image sensor and a first imaging optical arrangement in imaging connection with the image sensor, the first imaging optical arrangement being configured to define a first field of view of the image sensor having a wide angle of view lying, for example, in a range of 60° to 90°, or 60° to 120°, and a viewing direction of the image sensor to the back side of the first portion.

The second portion comprises a second imaging optical arrangement.

The first and the second portions are movably coupled to allow adjustment of the device to a closed position with the second portion lying opposite to the first portion, against the first back surface, with the second imaging optical arrangement aligned with the first imaging optical arrangement so as to define, together with the first imaging optical arrangement, a second field of view of the image sensor different from the first field of view, and to open positions with the second portion lying outside the first field of view of the image sensor.

In an embodiment, the second imaging optical arrangement is configured to produce the second field of view narrower than the first field of view.

In an embodiment where the second imaging optical arrangement is configured to produce the second field of view narrower than the first field of view, the second imaging optical arrangement comprises a teleconverter. The teleconverter may be, for example, a duplicate teleconverter.

In an embodiment which may be in accordance with any of the preceding embodiments, the first portion comprises a display on the first front surface thereof.

In an embodiment which may be in accordance with any of the preceding embodiments, the first and the second portions are slidably coupled.

In an embodiment which may be in accordance with any of the preceding embodiments except or the previous one, the first and the second portions are foldably coupled, the second portion having a second front surface and an opposite second back surface facing to front and back sides of the second portion, respectively; the portable device being foldable to a folded position with the first and the second back surfaces of the first and the second portions lying against each other, and to open positions with an opening angle between the back surfaces.

In an embodiment in accordance with the previous embodiment, the first and the second portions comprise a first and a second display section, respectively, facing towards the front sides of the first and the second portions.

In an embodiment in accordance with the previous embodiment, the first and the second portions are coupled via a flexible folding portion, the first and the second display sections forming a single flexible display extending over the flexible folding portion.

In an embodiment which may be in accordance with any of the two embodiments preceding the previous embodiment, the first and the second portions are coupled via a flexible folding portion.

In an embodiment which may be in accordance with any of the two embodiments preceding the two previous ones, the first and the second portions are coupled via a hinge about which the first and the second portions are pivotable relative to each other.

In an embodiment which may be in accordance with any of the preceding embodiments, the image sensor is configured to detect infrared light.

In an embodiment in accordance with the previous embodiment, the first portion further comprises an infrared light source configured to illuminate a scene viewed by the image sensor by infrared light.

In an embodiment which may be in accordance with any of the preceding embodiments, the first portion extends along a central plane, and the first imaging optical arrangement is folded so as to guide light to the image sensor substantially parallel to the central plane In an embodiment which may be in accordance with any of the preceding embodiments, the portable device is implemented as a mobile phone, a smart phone, a laptop computer, or a tablet computer.

In a second aspect, a portable device comprises a first portion and a second portion which are foldably coupled, each of them having a front surface and an opposite back surface facing to front and back sides of the first and the second portions, respectively.

The portable device is foldable to a folded position with the back surfaces of the first and the second portions lying against each other, and to open positions with a non-zero opening angle between the back surfaces.

The first and the second portions comprise a first and a second display section, respectively, facing towards the front sides of the first and the second portions.

The first portion comprises an image sensor and a first imaging optical arrangement in imaging connection with the image sensor, configured to define a viewing direction of the image sensor to the back side of the first portion.

The second portion comprises a second imaging optical arrangement located, with the device in the folded position, so as to form, together with the first imaging optical arrangement, a combined imaging optical arrangement in imaging connection with the image sensor.

In an embodiment, the first imaging optical arrangement defines a first field of view of the image sensor, and the combined imaging optical arrangement defines a second field of view of the image sensor which is different from the first field of view. The second field of view may be narrower than the first field of view of the image sensor.

In a third aspect, a portable device comprises a first portion and a second portion, the first portion having a first front surface and an opposite first back surface facing to front and back sides of the first portion, respectively.

The first portion comprises an image sensor and a first imaging optical arrangement in imaging connection with the image sensor, the first imaging optical arrangement being configured to define a first field of view of the image sensor, and a viewing direction of the image sensor to the back side of the first portion.

The second portion comprises a second imaging optical arrangement.

The first and the second portions are movably coupled to allow adjustment of the device to a closed position with the second portion lying opposite to the first portion, against the back surface thereof, with the second optical arrangement aligned with the first imaging optical arrangement so as to define, together with the first optical arrangement, a second field of view of the image sensor different from the first field of view, and to open positions with the second portion lying outside the first field of view of the image sensor.

The first portion further comprises a flash light source and a first flash optical arrangement configured to guide light emitted by the flash light source to the back side of the first portion, into a first field of illumination.

The second portion further comprises a second flash optical arrangement located so as to be positioned, with the device in the closed position, aligned with the first flash optical arrangement, so as to form, together with the first flash optical arrangement, a combined flash optical arrangement configured to guide light emitted by the flash light source into a second field of illumination different from the first field of illumination.

In an embodiment, the first field of view of the image sensor is wider than the second field of view, and the first field of illumination is wider than the second field of illumination.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and portable devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A portable device comprising a first portion and a second portion, the first portion having a first front surface and an opposite first back surface facing to front and back sides of the first portion, respectively;
   the first portion comprising an image sensor and a first imaging optical arrangement in imaging connection with the image sensor, the first imaging optical arrangement being configured to define a first field of view of the image sensor having a wide angle of view, and a viewing direction of the image sensor to the back side of the first portion;
   the second portion comprising a second imaging optical arrangement;

the first and the second portions being foldably coupled to allow adjustment of the device to a closed position with the second portion lying opposite to the first portion, against the first back surface, with the second imaging optical arrangement aligned with the first imaging optical arrangement so as to define, together with the first imaging optical arrangement, a second field of view of the image sensor different from the first field of view, and to open positions with the second portion lying outside the first field of view of the image sensor;

wherein the second portion has a second front surface and an opposite second back surface facing to front and back sides of the second portion, respectively; and the portable device being foldable to the closed position with the first and the second back surfaces of the first and the second portions lying against each other, and to the open positions with an opening angle between the back surfaces.

2. A portable device as defined in claim 1, wherein the wide angle of view of the first field of view lies in a range of 60° to 120°, for example, in a range of 60° to 90°.

3. A portable device as defined in claim 1, wherein the second imaging optical arrangement is configured to produce the second field of view narrower than the first field of view.

4. A portable device as defined in claim 3, wherein the second imaging optical arrangement comprises a teleconverter.

5. A portable device as defined in claim 1, wherein the first portion comprises a display on the first front surface thereof.

6. A portable device as defined in claim 1, wherein the first and the second portions comprise a first and a second display section, respectively, facing towards the front sides of the first and the second portions.

7. A portable device as defined in claim 6, wherein the first and the second portions are coupled via a flexible folding portion, the first and the second display sections forming a single flexible display extending over the flexible folding portion.

8. A portable device as defined in claim 1, wherein the first and the second portions are coupled via a flexible folding portion.

9. A portable device as defined in claim 1, wherein the first and the second portions are coupled via a hinge about which the first and the second portions are pivotable relative to each other.

10. A portable device as defined in claim 1, wherein the image sensor is configured to detect infrared light.

11. A portable device as defined in claim 10, wherein the first portion further comprises an infrared light source configured to illuminate a scene viewed by the image sensor by infrared light.

12. A portable device as defined in claim 1, wherein the first portion extends along a central plane, and the first imaging optical arrangement is folded so as to guide light to the image sensor substantially parallel to the central plane.

13. A portable device as defined in claim 1, implemented as a mobile phone, a smart phone, a laptop computer, or a tablet computer.

14. A portable device comprising a first portion and a second portion foldably coupled, each of them having a front surface and an opposite back surface facing to front and back sides of the first and the second portions, respectively;

the portable device being foldable to a folded position with the back surfaces of the first and the second portions lying against each other, and to open positions with a non-zero opening angle between the back surfaces;

the first and the second portions comprising a first and a second display section, respectively, facing towards the front sides of the first and the second portions;

the first portion comprising an image sensor and a first imaging optical arrangement in imaging connection with the image sensor, configured to define a viewing direction of the image sensor to the back side of the first portion;

the second portion comprising a second imaging optical arrangement located, with the device in the folded position, so as to form, together with the first imaging optical arrangement, a combined imaging optical arrangement in imaging connection with the image sensor.

15. A portable device as defined in claim 14, wherein the first imaging optical arrangement defines a first field of view of the image sensor, and the combined imaging optical arrangement defines a second field of view of the image sensor which is different from the first field of view.

16. A portable device as defined in claim 15, wherein the second field of view is narrower than the first field of view of the image sensor.

17. A portable device comprising a first portion and a second portion, the first portion having a first front surface and an opposite first back surface facing to front and back sides of the first portion, respectively;

the first portion comprising an image sensor and a first imaging optical arrangement in imaging connection with the image sensor, the first imaging optical arrangement being configured to define a first field of view of the image sensor, and a viewing direction of the image sensor to the back side of the first portion;

the second portion comprising a second imaging optical arrangement;

the first and the second portions being movably coupled to allow adjustment of the device to a closed position with the second portion lying opposite to the first portion, against the back surface thereof, with the second optical arrangement aligned with the first imaging optical arrangement so as to define, together with the first optical arrangement, a second field of view of the image sensor different from the first field of view, and to open positions with the second portion lying outside the first field of view of the image sensor;

the first portion further comprising a flash light source and a first flash optical arrangement configured to guide light emitted by the flash light source to the back side into a first field of illumination;

the second portion further comprising a second flash optical arrangement located so as to be positioned, with the device in the closed position, aligned with the first flash optical arrangement, so as to form, together with the first flash optical arrangement, a combined flash optical arrangement configured to guide light emitted by the flash light source into a second field of illumination different from the first field of illumination.

18. A portable device as defined in claim 17, wherein the first field of view of the image sensor is wider than the second field of view, and the first field of illumination is wider than the second field of illumination.

19. A portable device as defined in claim 1, further comprising a flash light source configured to guide light emitted by a flash light source into a first field of illumination or a second field of illumination, wherein the second field of illumination is different from the first field of illumination.

20. A portable device as defined in claim 14, wherein the image sensor is configured to detect infrared light.

* * * * *